United States Patent
Schurg (10) Patent No.: US 7,108,326 B2
(45) Date of Patent: Sep. 19, 2006

(54) SEAT, ESPECIALLY AN AIRPLANE SEAT (75) Inventor: Hartmut Schurg, Schwabisch Hall (DE)

(73) Assignee: Recaro Aircraft Seating GmbH & Co. KG, Schwabisch Hall (DE)

( * ) Notice: Subject to any disclaimer, the term of this patent is extended or adjusted under 35 U.S.C. 154(b) by 0 days.

(21) Appl. No.: 10/496,645

(22) PCT Filed: Mar. 7, 2003

(86) PCT No.: PCT/EP03/02334

§ 371 (c)(1),
(2), (4) Date: May 25, 2004

(87) PCT Pub. No.: WO03/084811
PCT Pub. Date: Oct. 16, 2003

(65) Prior Publication Data
US 2005/0046259 A1    Mar. 3, 2005

(30) Foreign Application Priority Data
Apr. 5, 2002   (DE) ................. 102 15 028

(51) Int. Cl.
*A47C 1/02* (2006.01)
*A47C 1/12* (2006.01)
*B60N 2/12* (2006.01)
*B60N 2/22* (2006.01)
*B60N 2/24* (2006.01)

(52) U.S. Cl. ................. 297/354.12; 297/317; 297/318; 297/325; 297/329; 297/340; 297/341; 297/342; 297/343

(58) Field of Classification Search ................. 297/343, 297/317, 318, 325, 326, 327, 329, 256.13, 297/354.12, 340, 341, 342
See application file for complete search history.

(56) References Cited

U.S. PATENT DOCUMENTS 1,756,807 A * 4/1930 Black et al. ................. 297/329

(Continued)

FOREIGN PATENT DOCUMENTS

DE    26 44 412 A1    4/1978

(Continued)

*Primary Examiner*—Rodney B. White
(74) *Attorney, Agent, or Firm*—Roylance, Abrams, Berdo & Goodman, L.L.P.

(57) ABSTRACT

A seat, preferably an aeroplane seat, includes a seat base (12) which can be positioned on the floor and seat components which are provided for each seat and are arranged on the seat base (12). The seat components can be a seat back (1) and a seating element (2) with a front region (3) and a rear region (4). The rear region is located at the point where the seating element joins the seat back (1). The seat back can be displaced from an upright position to an inclined position and vice versa, simultaneously adjusting the inclination of the seating element (2). The front region (3) of the seating element (2) essentially maintains its height above the floor. The rear region (4) sinks as the seat back (1) increasingly inclines. The seat back (1) has at least one first part (5) and one second part (6) which at least partially support each other with the adjacent surfaces and which can be displaced in relation to each other during the adjustment of the inclination of the seat back (1). The inclination of the seating element (2) is automatically adjusted. As a result, the rear region of the seating element significantly sinks as soon as the seat back is slightly inclined towards the rear, with the front region of the seating element maintaining the same position.

20 Claims, 4 Drawing Sheets

U.S. PATENT DOCUMENTS

| | | | |
|---|---|---|---|
| 2,229,608 A * | 1/1941 | Ragsdale et al. | 297/317 X |
| 2,818,909 A * | 1/1958 | Burnett | 297/329 X |
| 3,567,280 A * | 3/1971 | Bradshaw | 297/318 |
| 3,572,826 A * | 3/1971 | Barnes | 297/343 X |
| 3,632,165 A * | 1/1972 | Miller | 297/343 X |
| 4,018,166 A * | 4/1977 | Gutridge et al. | 297/343 X |
| 4,362,336 A | 12/1982 | Zapf et al. | 297/343 X |
| 4,452,486 A * | 6/1984 | Zapf et al. | 297/343 |
| 4,709,960 A * | 12/1987 | Launes | 297/329 X |
| 4,915,446 A * | 4/1990 | Darling et al. | 297/256.13 X |
| 5,112,109 A * | 5/1992 | Takada et al. | 297/343 |
| 5,133,587 A | 7/1992 | Hadden, Jr. | |
| 5,219,204 A * | 6/1993 | Bathrick et al. | 297/343 X |
| 5,533,305 A * | 7/1996 | Bielecki | 297/343 X |
| 5,558,399 A * | 9/1996 | Serber | 297/343 X |
| 5,636,898 A | 6/1997 | Dixon et al. | |
| 5,735,574 A * | 4/1998 | Serber | 297/343 X |
| 6,059,364 A * | 5/2000 | Dryburgh et al. | 297/343 X |
| 6,158,810 A * | 12/2000 | Galloway | 297/343 X |
| 6,425,635 B1 * | 7/2002 | Pulver | 297/325 X |
| 6,578,917 B1 * | 6/2003 | Aubert et al. | 297/317 |
| 6,739,661 B1 * | 5/2004 | Dukes | 297/329 X |
| 6,746,080 B1 * | 6/2004 | Tsugimatsu et al. | 297/256.13 |
| 6,769,739 B1 * | 8/2004 | Salzer et al. | 297/317 X |
| 2002/0145319 A1 * | 10/2002 | Tsugimatsu et al. | 297/256.13 |

FOREIGN PATENT DOCUMENTS

| | | | |
|---|---|---|---|
| DE | 42 22 222 A1 | 1/1994 | |
| DE | 4225286 A1 * | 2/1994 | 297/318 |
| EP | 1 057 725 A2 | 12/2000 | |
| FR | 1 441 985 A | 6/1966 | |
| FR | 2680734 A1 * | 3/1993 | 297/256.13 |
| GB | 2 268 876 A | 1/1994 | |
| JP | 58085730 A * | 5/1983 | 297/318 |
| WO | WO 00/29249 A1 | 5/2000 | |

* cited by examiner

SEAT, ESPECIALLY AN AIRPLANE SEAT

FIELD OF THE INVENTION

The present invention relates to a seat, preferably a passenger seat, and especially an aeroplane passenger seat. The seat has a seat frame which can be positioned on a floor, and seat components positioned on the seat frame. The seat components can be a seat back and a seat part with a front area and a back area at the location of the transition to the seat back. The seat back can be moved from an upright position into an inclined position and vice versa, while at the same time the seat part is adjusted in its incline. The front area of the seat part essentially maintains its height relative to the floor, while the back area is lowered with increasing inclination of the seat back.

BACKGROUND OF THE INVENTION

WO 00/29249 discloses a vehicle seat, with a seat part and a seat back part held on the seat frame by side cheeks and movable relative to the frame by an actuating drive. The actuating drive has body position detectors control-connected for moving the respective seat part or seat back part forward or backward to the body position assumed by the seat occupant or according to the body movement of the seat occupant. In this known approach, the seat part and the seat back part are adjustably guided in a type of restricted guidance, and are pivotally connected to one another by an articulated axis. The seat part and the seat back part are each guided with a distance to the articulated axis and are rotatable around their guide axes. The indicated body position detector is designed as a distance measuring means, but can also be a pressure sensor or pressure switch which allows adjustment motion of the seat controlled by the operator.

The known seat design is ergonomically perfected and allows a plurality of adjustment possibilities. The seat part and seat back part can also be controlled and adjusted separately from one another. Based on the indicated sensor technology by the body position detectors, the associated control cost for the seat is correspondingly high so that the known seat design is expensive and complex to produce. As a result of the plurality of components and the indicated control, failures in operation cannot be avoided. Furthermore, the known seat is relatively heavy, indicating that its use in the aircraft domain is not altogether practical, so that the pertinent seats are used preferably in the first class section of aircraft.

U.S. Pat. No. 5,636,898 and EP-A-1 057 725 disclose comparable seat designs. The front area of the seat part is raised automatically with the tilt adjustment of the seat back into a backward position, by which the tilt adjustment for the seat part itself inevitably arises. Since the raising of the thigh of the seat occupant is associated with the raising of the front edge of the seat part, overall the legs are moved away from the respective floor of the vehicle. This movement is perceived as not always pleasant from the ergonomic standpoint of the operator or passenger.

Conversely, DE-C-42 22 222 and U.S. Pat. No. 5,133,587 have already proposed essentially fixing the front area of the seat part by a type of rotary or swivel function in height relative to the floor and swivelling the seat back together with the seat part. The seat back and seat part are designed as a common shell for a change in the position of the seat components relative to the front edge of the seat part. In the pertinent designs, generally a distinct tilt adjustment of the seat back, in addition to its lowering into the backward position, is necessary in order to be able to lower the seat part in an ergonomically favorable manner in the back area. For a correspondingly comfortable adjustment process, the seat back, therefore, has to be inclined far back. This arrangement entails loss of comfort for the individual in the row of seats behind.

SUMMARY OF THE INVENTION

Objects of the present invention are to provide improved seat designs such that with low mechanical effort and using a minimum of space, comfortable, ergonomically favorable matching of the seat to the concerns of the respective seat occupant is achieved. Other objects are to provide an improved seat which is to be economically implemented and to require little structural weight.

These objects are basically attained by a seat according to the present invention. The seat back has at least one first back part and another back part which are at least partially in contact with one another with their facing surfaces. The seat back parts can be adjusted relative to one another when the inclination of the seat back is adjusted, such that tilt adjustment for the seat part takes place automatically. When the seat back is tilted back slightly, a distinct lowering of the back area of the seat part is obtained. The forward area of the seat part maintains its position. Consequently, when the seat back is leaned slightly backward, compared to the known approaches the opening angle for the seat part is distinctly increased so that a high degree of comfort is achieved for the seat with the associated seat frame in a reduced installation space. The relative motion between the first and second back parts, which ultimately automatically causes the lowering of the seat part in the back area, is dictated by a structurally simple control design which is technically extremely reliable in operation, which requires few structural components, and which still provides a high degree of comfort. As a result of the few required components, the seat can be largely built to be lightweight, making its use especially advantageous in aircraft. In particular, the use of the seat in the so-called economy section of aircraft is intended. It is also quite possible to use the seat for seating in movie theaters or the like to enhance comfort.

In one preferred embodiment of the seat of the present invention, the first back part is provided with seat upholstery and the second back part is designed as a frame or back shell holding the first back part in its back area. By designing the second back part as a frame or back shell, the forces applied to first back part can be deflected at the same time, especially in the event of a crash. Also, the second back part can be made lightweight, provided that the first back part accommodates the forces which are applied largely structurally.

In another preferred embodiment the first seat back part is connected to the seat part. Particularly, the seat part with a definable angle is coupled to first back part. In the pertinent configuration, the first back part and the seat part can be connected to one another in one piece. Surprisingly, in spite of the rigid connection, when the second back part is reset and consequently when the seat back is inclined, the seat part at the same time is lowered in an ergonomically favorable manner in the back area. If the first back part is connected to the seat part by at least one swivelling axis, there is moreover the possibility of further increasing the opening angle previously referred to when resetting the incline. In addition, the variance of adjustment possibilities between the first back part and the assigned seat part is higher.

In another preferred embodiment of the seat of the present invention, the back parts are coupled to one another by way of a coupling mechanism, in particular by way of a longitudinal guide such that in the upright position the top edge of the back of the first back part ends in the area of the top edge of the second back part and such that in a suitable position conversely the top edge of the back of the first back part is lowered together with the back area of the seat part. This arrangement yields an elegant structure of the seat. By the coupling mechanism being designed as a longitudinal guide, the relative adjustment of the back parts relative to one another can be undertaken reliably and with precision using few components. Preferably, the swiveling axis for the second back part in the upright position has essentially the same height as the back area of the seat part, and in the inclined position, the swiveling axis runs above the back area of the seat part.

If, in another preferred embodiment of the seat of the present invention, the first back part with the assigned seat part is designed as a base frame with a net covering bearing the seat upholstery. By the indicated net covering, effective application of force to the seat and consequently, to the seat frame can be achieved, especially in the case of a crash. This arrangement ensures that the base frame does not collapse unintentionally.

In another preferred embodiment of the seat of the present invention, the base frame, as part of the coupling mechanism, bears guide parts which fit partially into guides of the respectively assignable armrest and/or into parts of the seat frame. As a result, the guides with their imaginary extensions delimit a type of circular arc with a center point which is the imaginary pivot for the motion of the base frame relative to the second back part. The swivelling motion of the seat part and the back part then essentially takes place around the imaginary pivot which has been obtained without the seat part necessarily being moved translationally in the longitudinal direction or the front edge of the seat part undergoing an ergonomically unfavorable lifting motion.

In another preferred embodiment of the seat of the present invention, the second back part is provided with a folding table part on its rear. In the folded-up state of the table part, its locking means can permit possible equalization of length between the table part and the second back part. In this way, it is ensured that when the inclination of the seat back is adjusted, the table part is entrained. In each tilt adjustment position of the seat back, the table part can be folded out, and, for the operator seated behind, can be made accessible for his use.

In another preferred embodiment of the seat of the present invention, a plurality of seats arranged next to one another are mounted on a common seat frame.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
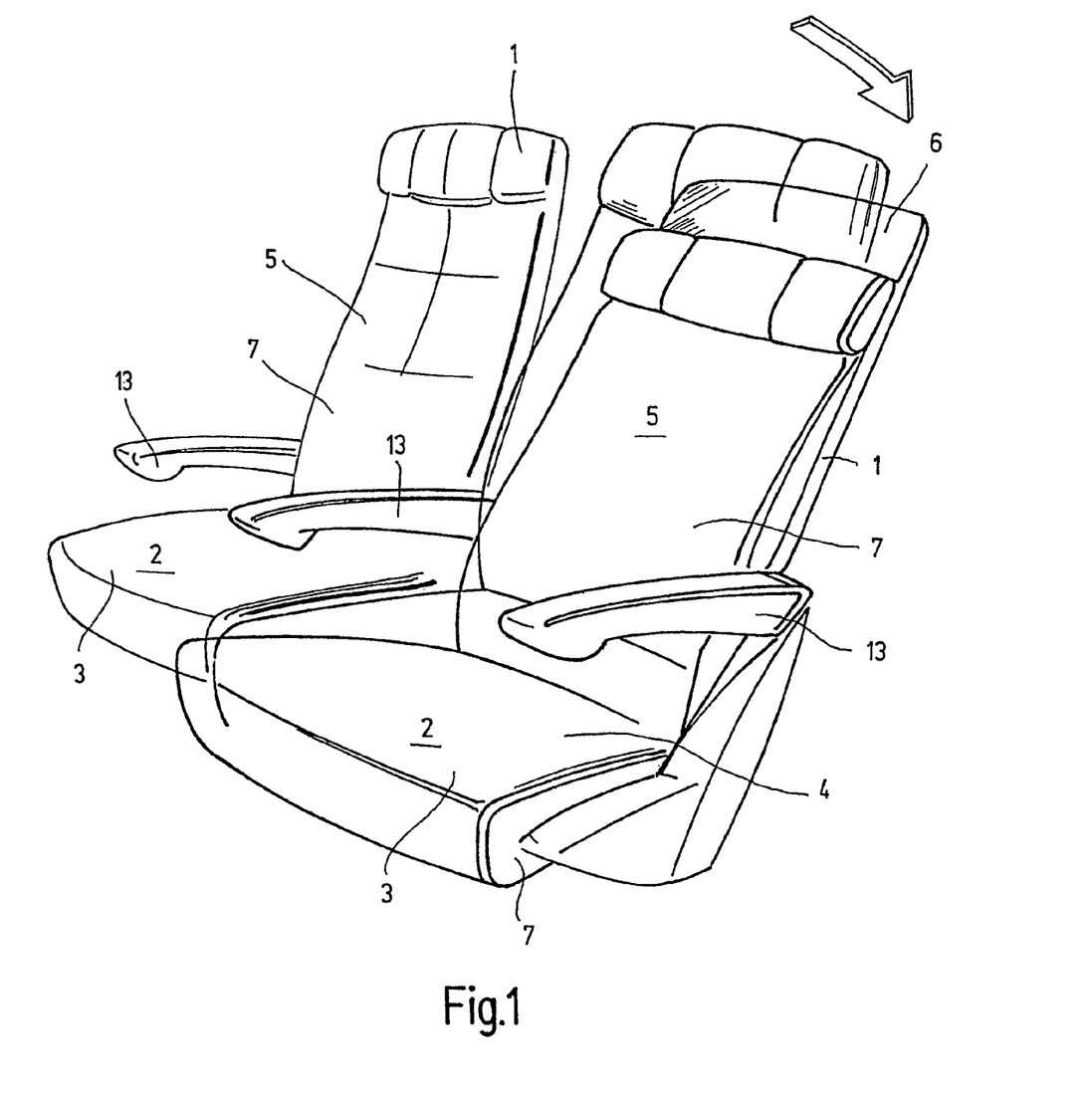
FIG. 1 is a front perspective view of two seats according to the present invention located next to one another and being in two different adjustment positions.

FIG. 1 illustrates an embodiment of the seat of the present invention with a seat back 1 and a seat part 2. Seat part 2 has a front area 3, and a back area 4 at the location of the transition to the seat back 1. The seat back 1 includes a one first back part 5 and another or second back part 6. The facing surfaces of these seat back parts are at least partially in contact with one another and are adjustable relative to one another. The adjustment motion of the seat back 1, which is indicated in FIG. 1 by the arrow, into one of its tilt positions causes relative displacement of the first back part 5 relative to the second back part 6, along with a change of the tilt adjustment for the seat part 2.

Figure 2A:
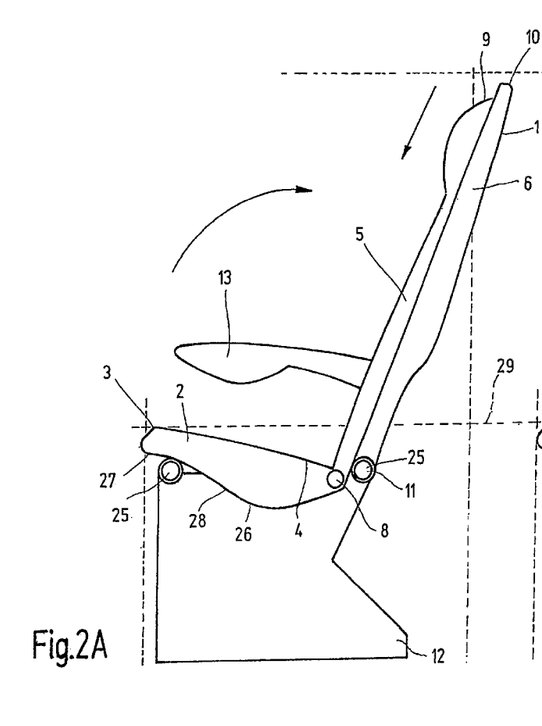
FIGS. 2A and 2B are side elevational views of two different adjustment positions of one seat of FIG. 1.
Figure 2B:
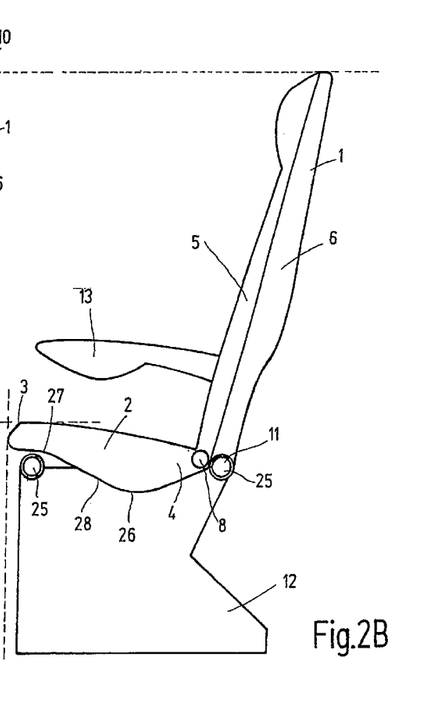

FIGS. 2A and 2B present the sequence of motions which accompany the change of the setting of the seat back 1. In the base position of the seat shown in FIG. 2B, the seat back 1 is in the almost upright position and the seat part 2 is in the almost horizontal position. To adjust the seat to a comfortable position, it is desirable to incline the seat back 1 to the rear and at the same time to lower the back area 4 of the seat part 2, without lifting the front area 3 of the seat part 2 in order not to exert increased surface pressure on the areas of the lower leg near the hollow of the knee. This increased surface pressure, for example, could cause restricted circulation, and thus, represents a limitation of comfort. The described manner of adjustment is achieved in that when the seat back 1 is swivelled backward, first back part 5 which bears the upholstery 7 slides down on the second back part 6. In this movement, the process changes the incline of the seat part 2 changes by the connection in the form of an axis 8, such that the backward area 4 of the seat part 2 is lowered. As a result, the height of the front area 3 of the seat part 2 remains essentially unchanged. In the described process, the top edge 9 of the first back part 5 is lowered relative to the top edge 10 of the second back part 6. The location of the axis 8 relative to the coupling point 11 is also displaced to the corresponding degree. Tilt adjustment takes place around this coupling point 11 which also forms the swivelling axis for the entire seat back 1. The movement position with the lowered seat part 2 is shown in FIG. 2A.

Figure 3:
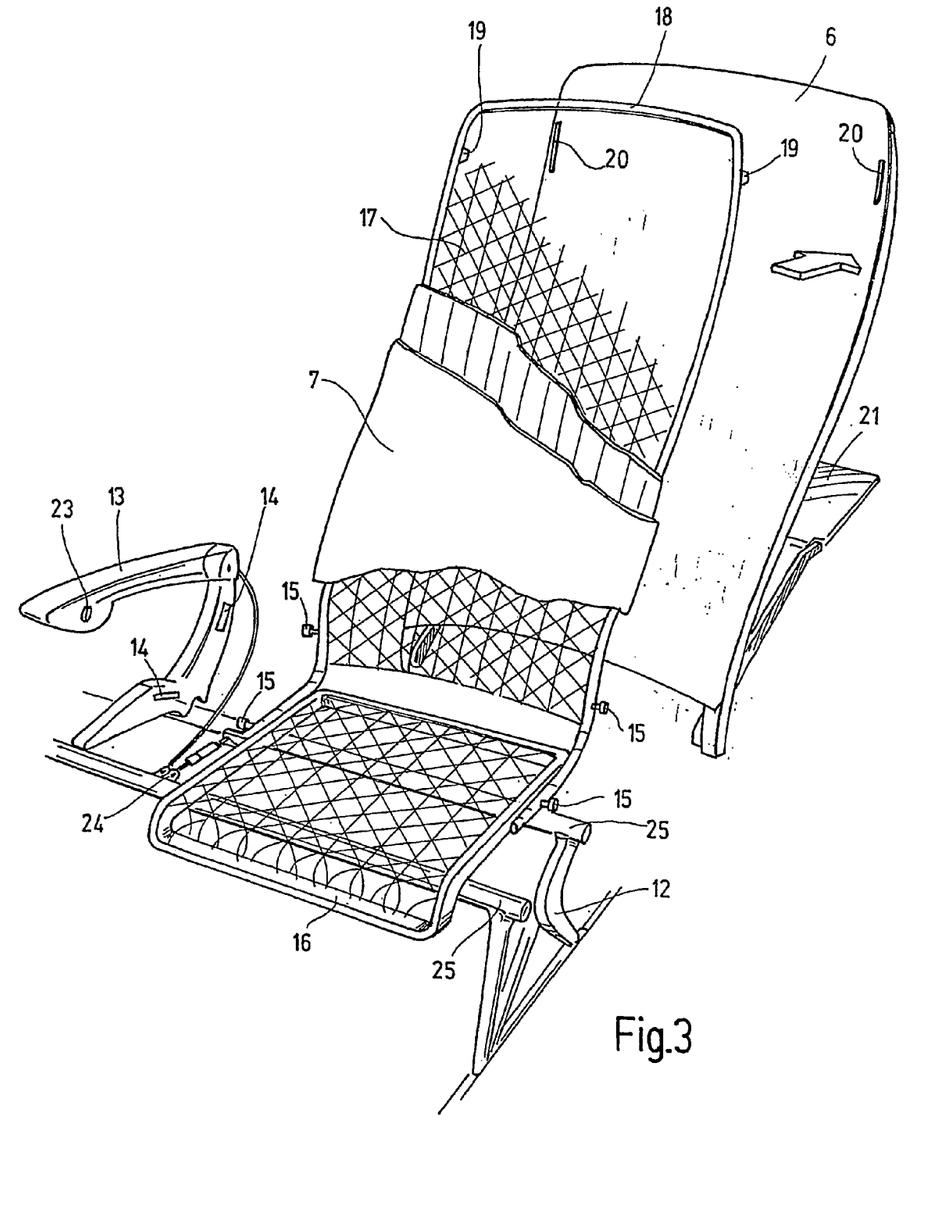
FIG. 3 is an exploded perspective view, with a partial elevation of the essential components of the seat of FIG. 1.

FIG. 3 illustrates the seat which a seat frame 12 which can be positioned on a floor. Two cross members 25 extend on this seat frame at its top end. To either side of each seat an armrest 13 can be attached to the cross members 25 in a manner which is not detailed. In armrest guides 14, designed as elongated recesses, assignable guide parts 15 can be accommodated and are fixed on the base frame 16 of the seat. Depending on the selection of the length of the cross members 25, it is possible to place not only one seat, but a plurality of seats next to one another in the transverse direction on one seat frame 12. This structure saves money and weight per installed seat.

The base frame 16 is formed from the respective frame parts of first back part 5 and the seat part 2. In an integral configuration of the base frame 16 the respective frame parts are rigidly connected to one another. In another embodiment which is not shown, the base frame 16 is designed partially movable in itself by the frame part of the seat part 2 being pivotally connected to the frame part of first back part 5 by way of another swivelling axis (not shown) in its back area 4 or approximately in the middle. Since for the adjustment motion of the seat back 1 the guide parts 15 are movably held in the guides 14, the guides 14 have a shape adapted to the desired direction in which the adjustment motion runs, especially a straight slotted or curved slotted shape.

To release and lock the adjustment motion of the seat back 1 and the seat part 2, a locking means 24 can be controlled by a control element 23 which is preferably integrated in the armrest 13. Control can take place mechanically, electrically or hydraulically. Preferably, the locking means 24 allows continuous adjustment of the seat. There can also be adjustment modes which allow adjustment of the seat automatically to certain defined or definable positions. In the area of its upper end part 18, the base frame 16 has other guide parts 19 connected to the other back part 6. For this purpose, the guide parts 19 fit into the other guides 20 which are made as elongated recesses on the other back part 6.

The other or second back part 6 in FIG. 3 is designed as a back shell which holds one back part 5 in its back area. The second back part 6 can however also be designed as a stiff tube frame construction, with which a further weight savings can be achieved. The main function of the other back part 6 is forming a mechanical abutment and a guide for first back part 5 and in this way mechanically stabilizing the entire construction. By possible division of the supporting function between the first back part 5 and the second back part 6, the first back part 5 and the entire base frame 16 can be made as a lightweight structure.

With the described configuration, the base frame 16 is overall a part of a coupling mechanism which movably connects the first back part 5 to the second back part 6 or to the armrest 13 by the guide parts 15 and the other guide parts 19, respectively. The base frame 16 is provided with a net covering 17 and bears the upholstery 7 of the seat. By suitable material selection in the net covering 17, for example, in the form of a synthetic monofilament such as nylon, the net covering 17 can not only be made very lightweight, but due to the high tensile strength at the same time allows an increase in the torsional stiffness of the base frame 16. By suitable selection of the type of net covering 17, a three-dimensional shape of the net covering 17 can be achieved so that with ergonomic shaping of the seat by the corresponding contouring of the upholstery 7 further material savings are possible.

Figures 4A, 4B:
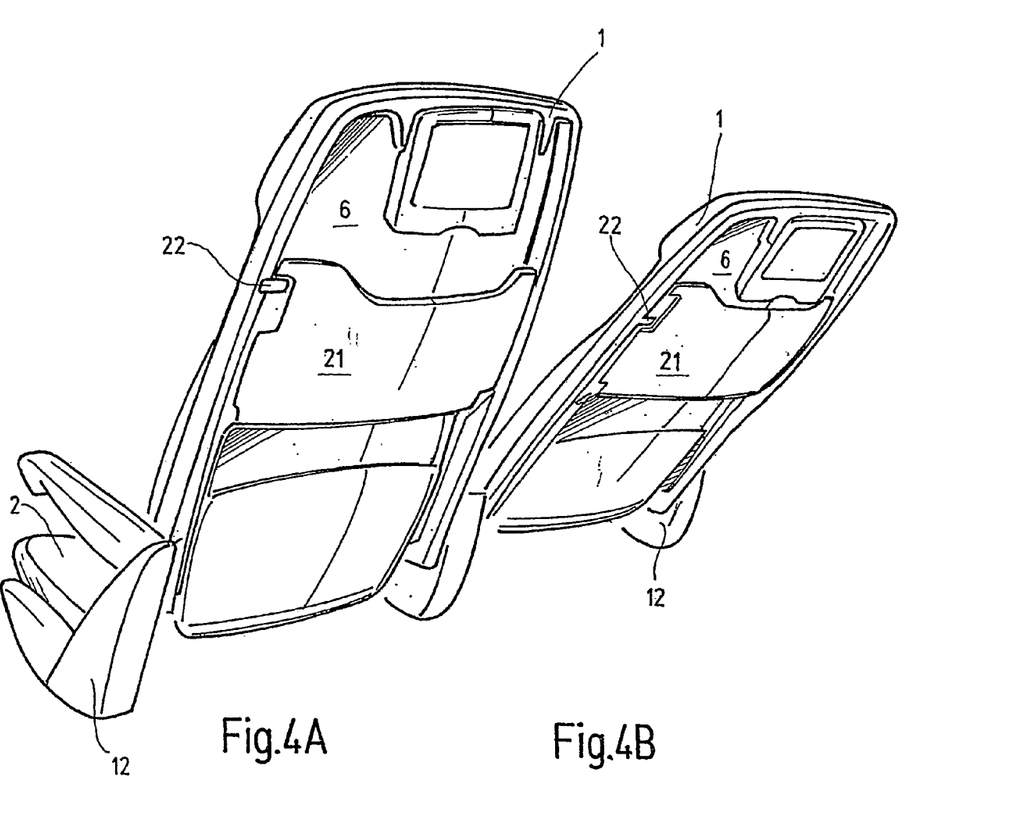
FIGS. 4A and 4B are rear perspective views of the seats of FIG. 1 in two different adjustment positions, with the table part folded up.

On the rear of the second back part 6 there is a folding table part 21, as can readily be seen from FIGS. 4A and 4B. The folding table part 21 is held by a locking means 22 in the folded-up state shown in FIGS. 4A and B. The locking means 22 in the adjustment motion of the seat approximately from the upright position (FIG. 4A) into an inclined position (FIG. 4B) of the seat back 1 allows equalization of the length between the folding table part 21 and the second back part 6. As a result, a displacement motion of the folding table part 21, which proceeds simultaneously with the adjustment motion of the seat back 1, takes place relative to the locking means 22 located stationary on the second back part 6.

The described displacement motion occurs in the case of a separate coupling, i.e., one which takes place on different swivelling axes, of the second back part 6 and of the folding table part 21. By joint coupling to the coupling point 11, the displacement motion can therefore be avoided. In any case, coupling of the folding table part 21 takes place, however, such that the table part in the folded-down operating state always remains unaffected by the adjustment motion of the seat back 1.

The two longitudinal guides 14 in the area of the armrest 13, with their imaginary extensions in the direction of the seat frame 12, form an obtuse angle with one another. If a circle were to be drawn by approximation through the two guides 14, the middle point of this imaginary circle would be the pivot or center of gravity around which the base frame 16 is displaced by way of the guide parts 15 in the guides 14. Since in the pertinent "side to side rocking" the other guide parts 19 on the top end part of the base frame 18 slide in the other guides 20 of the second back part 6, the second back part 6 is necessarily entrained into the backward inclined position according to the arrow as shown in FIG. 3. After actuating the locking means 24, the pertinent motion is controlled exclusively by the weight of the seat occupant so that with few adjustment and control means tilt adjustment takes place with simultaneous lowering of the seat part bottom. In order to prevent the second back part 6 from unintentionally folding down from the first back part 5, the other guide parts 19 on the base frame 16 can be provided with fixing means, for example in the form of widened pegs (not shown) which counteract the disengagement of each guide part 19 with the assigned other guide 20.

The second back part 6 in the embodiment shown is built as a shell element which basically does not accommodate any forces. To further reduce the weight, instead of the indicated shell part, the second back part 6 could also be designed as a frame or frame hoop in which the base frame 16 and consequently the first back part 5 can slide. If the locking means 24 is provided with the corresponding force means, such as servo cylinders, by actuating the locking means 24, supported motion in the opposite direction can be implemented, in which the seat back 1 is reset into the upright position.

To ensure a harmonious sliding motion, at least the front cross member 25 of the respective seat frame 12 is designed as a slide roller, and the seat part 2 on its bottom as seen in the line of sight to FIGS. 2A, B has a type of sliding block guide 26. In the front area 3, a concave component 27 passes into a convex component 28. This convex component 28 is more sharply curved than the concave component 27, and results in reinforcement of the seat part 2 in this area. With intensified application of force (crash case) by the seat occupant in the direction of the straight arrow shown in FIG. 2A, the forces can be securely captured by way of the seat part 2. The concave component 27 of the sliding block guide 26 conversely ensures that more or less frictionless sliding motion of the front area 3 of the seat part 2 is possible, in its lowering motion as shown in FIG. 2A or in the return motion as shown in FIG. 2B.

As furthermore shown in FIGS. 2A and 2B, with a rigid configuration of the base frame 16 the angle between the first back part 5 and the seat part 2 is essentially constant (approximately 100 degrees) regardless of the respective tilt adjustment situation of the seat back 1. While the seat back 1 is tilted backward as shown in FIG. 2A in the direction of the curved arrow, specifically around the coupling point 11, the first back part 5 within the second back part 6 is displaced in the direction of the longitudinal or straight arrow shown in FIG. 2A. As a result the axis 8 is lowered from the base position shown in FIG. 2B down to under the coupling point 11 (cf. FIG. 2A). In the upright position, the axis 8 is then located above the coupling point 11. For the pertinent lowering motion, the indicated angle between the first back part 5 and the seat part 2 remains essentially constant. With the pertinent tilt adjustment with simultaneous lowering of the back area 4 of the seat part 2, the front area 3 of the latter undergoes essentially no changes. In particular, the seat part 12 in the front area does not execute any lifting motion. Rather the horizontal plane is maintained, as represented in FIGS. 2A and 2B by the horizontal broken line 29. When the opening angle and the seat bottom angle are increased, the height under the hollows of the knees of a seat occupant remains the same so that in this way obstruction of blood circulation or the like cannot occur.

The basic seat construction is designed such that it can also be retrofitted for existing systems. Furthermore, by closing the guides 14, especially in the armrests 13, by suitable plastic closure pieces (not shown), the illustrated luxury seat can be converted back again into a conventional basic seat.

While one embodiment has been chosen to illustrate the invention, it will be understood by those skilled in the art that various changes and modifications can be made therein without departing from the scope of the invention as defined in the appended claims.

What is claimed is:

1. A seat, comprising:
a seat frame positionable on a floor;
a seat part located on said seat frame and having a front area and a back area, said seat part being movable between generally horizontal and inclined positions; and
a seat back located on said seat frame and connected to said seat part adjacent said back area, said seat back being movable between upright and inclined positions as said seat part moves between said horizontal and inclined positions thereof with said front area substantially maintaining a constant height and without substantially moving forward relative to the floor during such movement and with said back area being lowered with increasing inclination of said seat back, said seat back having first and second back parts at least partially in contact with one another at facing surfaces thereof and being adjustable relative to one another when said seat back is adjusted between said upright and inclined positions thereof, said seat part being adjusted automatically with tilt adjustment of said seat back.

2. A seat according to claim 1 wherein
said first back part has upholstery thereon; and
second back part is a frame holding said first back part in a back area thereof.

3. A seat according to claim 1 wherein
said first back part has upholstery thereon; and
said second back part is a back shell holding said first back part in a back area thereof.

4. A seat according to claim 1 wherein
said first and second back parts are coupled by a longitudinal guide locating a first top edge of said first back part adjacent a second top end of said second back part in said upright position thereof and locating said first top edge and said back area of said seat part lower in said inclined positions.

5. A seat according to claim 1 wherein
a coupling point of said second back part is essentially at a same height as said back area of said seat part in said upright position, and is above said back area of said seat part in said inclined position of said seat back.

6. A seat according to claim 1 wherein
said first back part is integrally connected and forms a base frame with said seat part, said base frame having a net covering bearing upholstery.

7. A seat according to claim 1 wherein
said first back part is connected to by at least one swiveling axis to and forms a base frame with said seat part, said base frame having a net covering bearing upholstery.

8. A seat according to claim 1 wherein
said first back part is coupled to and forms a base frame with said seat part, said base frame having a net covering bearing upholstery;
said base frame comprises guide parts mating with guide members on said seat frame.

9. A seat according to claim 8 wherein
said seat frame comprises arm rests on which said guide members are located.

10. A seat according to claim 8 wherein
said guide members are on a circular arc with a center point forming an imaginary pivot for movement of said base frame relative to said second back part.

11. A seat according to claim 1 wherein
said second back part has a folding table part on a back thereof, and held by a lock in a folded up state with equalization of length between said table part and said second back part.

12. A seat according to claim 1 wherein
additional seats are arranged next to one another on said seat frame.

13. A seat according to claim 1 wherein
said front area of seat part is pivotal relative to said seat frame.

14. A seat, comprising:
a seat frame positionable on a floor;
a seat part located on said seat frame and having a front area and a back area, said seat part being movable between generally horizontal and inclined positions; and
a seat back located on said seat frame and connected to said seat part adjacent said back area, said seat back being movable between upright and inclined positions as said seat part moves between said horizontal and inclined positions thereof with said front area substantially maintaining a constant height relative to the floor during such movement and with said back area being lowered with increasing inclination of said seat back, said seat back having first and second back parts at least partially in contact with one another at facing surfaces thereof and being adjustable relative to one another when said seat back is adjusted between said upright and inclined positions thereof, said seat part being adjusted automatically with tilt adjustment of said seat back, said seat part and said first seat back maintaining a substantially constant angle therebetween during movement thereof.

15. A seat according to claim 14 wherein
said constant angle is approximately 100 degrees.

16. A seat according to claim 14 wherein
said front area of said seat part is pivotal relative to said seat frame.

17. A seat, comprising:
a seat frame positionable on a floor;
a seat part located on said seat frame and having a front area and a back area, said seat part being movable between generally horizontal as inclined positions; and
a seat back located on said seat frame and connected to said seat part adjacent said back area, said seat back being movable between upright and inclined positions as said seat part moves between said horizontal and inclined positions thereof with said front area substantially maintaining a constant height and without substantially moving forward relative to the floor during such movement and with said back area being lowered with increasing inclination of said seat back, said seat back having first and second back parts at least partially in contact with one another at facing surfaces thereof and being adjustable relative to one another when said seat back is adjusted between said upright and inclined positions thereof, said seat part being adjusted automatically with tilt adjustment of said seat back;

a base frame formed of said seat part and said first back part;

first guide parts extending from one of said base frame and said seat frame;

first guide slots in the other of said base frame and said seat frame and receiving said first guide parts to control relative movement therebetween;

second guide parts extending from one of said first and second back parts; and second guide slots in the other of said first and second back parts receiving said second guide parts to control relative movement therebetween.

18. A seat according to claim 17 wherein said first guide parts extend from said base frame; said first guide slots are in said seat frame; said second guide parts extend from said first back part; and said second guide slots are in said second back part.

19. A seat according to claim 17 wherein said front area of said seat part is pivotable relative to said seat frame.

20. A seat according to claim 1 wherein said first back part is connected to said part at a relatively fixed angle.

* * * * *